United States Patent Office 3,394,102
Patented July 23, 1968

3,394,102
STABILIZED POLYOXYMETHYLENES
Ryoichi Wakasa, Shinichi Ishida, and Hiromichi Fukuda, Tokyo, Japan, assignors to Asahi Kasei Kogyo Kabushiki Kaisha, Osaka, Japan, a corporation of Japan
No Drawing. Continuation-in-part of application Ser. No. 300,914, Aug. 8, 1963. This application Oct. 7, 1966, Ser. No. 584,978
6 Claims. (Cl. 260—45.8)

ABSTRACT OF THE DISCLOSURE

A stabilized composition of a polyoxymethylene having a molecular weight of at least 20,000 and at least one hydantoin of the formula:

$$\begin{array}{c} (CH_2)_n-CH_2 \quad O \\ | \qquad\qquad | \quad\;\; \| \\ CH_2-\!\!-\!\!-C-\!\!-\!\!-\!\!-C \\ | \qquad\qquad | \\ H-N \quad\;\; N-H \\ \diagdown\;C\;\diagup \\ \| \\ O \end{array}$$

wherein $n$ is an integer from 2 to 5.

This application is a continuation-in-part of our earlier application Ser. No. 300,914 filed Aug. 8, 1963, now abandoned.

This invention relates to a process for stabilizing polyoxymethylene having a molecular weight of at least 20,000.

It is known that pure anhydrous formaldehyde can be polymerized to produce polyoxymethylene by the action of a polymerization catalyst, light, or a radioactive ray in the presence or absence of an inert solvent. Also trioxane which is a cyclic trimer of formaldehyde can be polymerized by the action of a catalyst or a radioactive ray. Polyoxymethylene produced by the above processes is known to decompose to produce monomeric formaldehyde. Accordingly, as is shown in Japanese Patent Pub. No. 5,439/59, 5,440/59, 3,886/61, processes comprising adding a stabilizer have been used. These processes are uneconomical and the polymer thus stabilized must be carefully washed. The above-said processes include adding such organic compounds as cited hereinunder. In such a case, the stabilizer is added during the polymerization or is added to the polyoxymethylene before the processing. Such stabilizers include:

(a) hydrazine, stabilized hydrazine and hydrazide
(b) secondary or tertiary aromatic amines
(c) phenols or substituted phenol
(d) urea, thiourea and the substituted products thereof
(e) polycarboxylic acid amides.

However, the effects of the above known stabilizers are insufficient for practical purposes. Moreover, polyoxymethylene treated with the above-said stabilizers is liable to produce a colored mould after being processed.

We have found that hydantoins are especially suitable as stabilizers for polyoxymethylene having a molecular weight of at least 20,000 and such polyoxymethylene can be stabilized by admixing hydantoin to only such an extent that not only is the polyoxymethylene not colored, but in fact the degree of whiteness is increased. Accordingly, a mould having a greater degree of whiteness than that of any known stabilized polyoxymethylene is obtained.

This invention is based on the above-said discovery and includes a process for stabilizing polyoxymethylene having a molecular weight of at least 20,000 which comprises admixing therewith one or more hydantoins having the formula:

$$\begin{array}{c} (CH_2)_n-CH_2 \quad O \\ | \qquad\qquad | \quad\;\; \| \\ CH_2-\!\!-\!\!-C-\!\!-\!\!-\!\!-C \\ | \qquad\qquad | \\ H-N \quad\;\; N-H \\ \diagdown\;C\;\diagup \\ \| \\ O \end{array}$$

wherein $n$ is an integer from 2 to 5.

The above-said hydantoins include 5,5-tetramethylene-spiro-hydantoin, 5,5-pentamethylene spiro hydantoin, 5,5-hexamethylene spiro hydantoin, and 5,5-heptamethylene spiro hydantoin.

The above-said hydantoin is used either alone or in mixed form, and in combination with the other well known stabilizers described in (a)–(e) above, such as phenol, aromatic amines, urea derivatives or hydrazine derivatives in the presence or absence of an organic solvent such as carbon tetrachloride, methylene chloride, pentane, heptane, tetrahydrofuran, diethylether, acetone, methyl ethyl ketone, methanol, ethanol, toluene, benzene; said solvent may contain water.

The amount of the stabilizer to be added is determined based on the effect of the hydantoin added and the properties of the polymer to be stabilized. The stabilizer is employed in a range from about 0.01 to 50% by weight, generally in the range from 0.1 to 20% by weight.

According to the process of the invention, polyoxymethylene mould having an excellent stability and excellent degree of whiteness can be economically and easily produced by a simple process comprising admixing hydantoins which are easily available and are generally stable into the polyoxymethylene before processing.

The details of the process of the invention are better understood from a consideration of the following examples which are merely given for the sake of illustration.

EXAMPLE 1

Polyoxymethylene having a molecular weight of 29,000 was produced by a process comprising introducing formaldehyde gas produced by thermal decomposition of paraformaldehyde into a reaction solvent such as n-heptane using tri-n-butylamine as a polymerization initiator. The intrinsic viscosity of the polyoxymethylene was 0.82. The thermal decomposition constant at 220° C. was 3.78%/min. Into 100 parts by weight of said polyoxymethylene, various hydantoins were mixed. The thermal decomposition constants were as follows:

| Hydantoin added (weight part) | Thermal decomposition velocity of polymer $K^{222}$ (percent/min.) | Property of mould |
|---|---|---|
| 5,5-pentamethylene spiro hydantoin, 1.0. | 0.79 | Uniformly white. |
| 5,5-pentamethylene spiro hydantoin, 5.3. | 0.60 | Do. |
| 5,5-pentamethylene spiro hydantoin, 10.0. | 0.49 | Do. |
| 5,5-pentamethylene spiro hydantoin, 25.0. | 0.20 | Do. |

NOTE.—The product produced by acetylating the above-said polyoxymethylene per se with acetic acid anhydride in the presence of pyridine was stabilized up to $K^{222}=0.20\%/\text{min.}$, but the product showed a pale yellow color.

What is claimed is:
1. A composition comprising a high molecular weight polyoxymethylene having a molecular weight greater than 20,000 and at least one hydantoin of the formula:

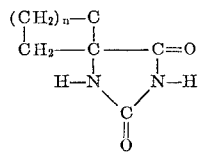

wherein $n$ is an integer from 2 to 5.

2. A composition as claimed in claim 1, wherein said hydantoin, is 5,5-tetramethylene-spiro-hydantoin.

3. A composition as claimed in claim 1, wherein said hydantoin is 5,5-pentamethylene-spiro-hydantoin.

4. A composition as claimed in claim 1 wherein said hydantoin is 5,5-hexamethylene-spiro-hydantoin.

5. A composition as claimed in claim 1 wherein said hydantoin is 5,5-heptamethylene-spiro-hydantoin.

6. A composition as claimed in claim 1 wherein said hydantoin is present in an amount of 0.01%–50% by weight.

References Cited

UNITED STATES PATENTS 2,481,981  9/1947  Craven _____ 260—340
3,240,748  3/1966  Schmidt et al. _____ 260—45.8

DONALD E. CZAJA, *Primary Examiner.*

M. J. WELSH, *Assistant Examiner.*